United States Patent
Lipton et al.

(10) Patent No.: US 9,527,257 B2
(45) Date of Patent: Dec. 27, 2016

(54) DEVICES AND METHODS FOR THE PRODUCTION OF MICROFIBERS AND NANOFIBERS HAVING ONE OR MORE ADDITIVES

(71) Applicant: CLARCOR Inc., Franklin, TN (US)

(72) Inventors: Roger Lipton, Austin, TX (US); Stephen Kay, Austin, TX (US); Yogesh Ner, McAllen, TX (US)

(73) Assignee: CLARCOR Inc., Franklin, TN (US)

( * ) Notice: Subject to any disclaimer, the term of this patent is extended or adjusted under 35 U.S.C. 154(b) by 379 days.

(21) Appl. No.: 13/960,365

(22) Filed: Aug. 6, 2013

(65) Prior Publication Data

US 2014/0035177 A1    Feb. 6, 2014

Related U.S. Application Data

(60) Provisional application No. 61/680,109, filed on Aug. 6, 2012, provisional application No. 61/776,054, filed on Mar. 11, 2013.

(51) Int. Cl.
| | |
|---|---|
| *D01D 5/18* | (2006.01) |
| *B29D 99/00* | (2010.01) |
| *B29C 47/00* | (2006.01) |
| *B29C 47/12* | (2006.01) |
| *B29C 47/30* | (2006.01) |
| *C03B 37/04* | (2006.01) |

(52) U.S. Cl.
CPC ............ *B29D 99/0078* (2013.01); *D01D 5/18* (2013.01); *B29C 47/0014* (2013.01); *B29C 47/122* (2013.01); *B29C 47/30* (2013.01); *C03B 37/04* (2013.01); *C03B 37/045* (2013.01)

(58) Field of Classification Search
CPC ...... D01D 5/00; D01D 5/0007; D01D 5/0015; D01D 5/0023; D01D 5/003; D01D 5/0038; D01D 5/0046; D01D 5/0053; D01D 5/0061; D01D 5/0069; D01D 5/0076; D01D 5/0084; D01D 5/0092
USPC ................... 264/484, 433, 465, 10
See application file for complete search history.

(56) References Cited

U.S. PATENT DOCUMENTS

| | | | |
|---|---|---|---|
| 3,622,293 | A | 11/1971 | Firnhaber |
| 3,928,009 | A | 12/1975 | Perry |
| 4,043,331 | A | 8/1977 | Martin et al. |
| 4,044,404 | A | 8/1977 | Martin et al. |
| 4,266,918 | A | 5/1981 | Manley |
| 4,323,525 | A | 4/1982 | Bornat |
| 4,639,390 | A | 1/1987 | Shoji |
| 4,657,743 | A | 4/1987 | Kanno |
| 4,842,505 | A | 6/1989 | Annis et al. |

(Continued)

FOREIGN PATENT DOCUMENTS

| | | |
|---|---|---|
| EP | 0 801 040 A2 | 10/1997 |
| WO | WO 91/13836 A1 | 9/1991 |

(Continued)

*Primary Examiner* — Timothy Kennedy
(74) *Attorney, Agent, or Firm* — Reinhart Boerner Van Deuren P.C.

(57) ABSTRACT

Described herein are apparatuses and methods of creating fibers, such as microfibers and nanofibers, which include additives that modify one or more properties of the produced fibers. The methods discussed herein employ centrifugal forces to transform material into fibers. Apparatuses that may be used to create fibers are also described.

25 Claims, 10 Drawing Sheets

(56) References Cited

U.S. PATENT DOCUMENTS

| | | |
|---|---|---|
| 5,522,879 A | 6/1996 | Scopelianos |
| 6,106,913 A | 8/2000 | Scardino et al. |
| 6,111,590 A | 8/2000 | Boezeman et al. |
| 6,141,992 A | 11/2000 | Gross et al. |
| 6,221,487 B1 | 4/2001 | Luo et al. |
| 6,235,392 B1 | 5/2001 | Luo et al. |
| 6,511,930 B1 | 1/2003 | Luo et al. |
| 6,596,033 B1 | 7/2003 | Luo et al. |
| 6,616,435 B2 | 9/2003 | Lee et al. |
| 6,713,011 B2 | 3/2004 | Chu et al. |
| 7,067,444 B2 | 6/2006 | Luo et al. |
| 7,083,854 B1 | 8/2006 | Joo et al. |
| 7,134,857 B2 | 11/2006 | Andrady et al. |
| 2002/0090725 A1* | 7/2002 | Simpson .............. D01D 5/0038 435/402 |
| 2005/0287239 A1* | 12/2005 | Joo ...................... D01D 5/0023 425/382.3 |
| 2007/0040305 A1* | 2/2007 | Armantrout ......... D01D 5/0985 264/465 |
| 2008/0290554 A1* | 11/2008 | Wu ...................... D01D 5/0069 425/174.8 E |
| 2009/0136651 A1* | 5/2009 | Larsen ................. A61K 38/363 427/2.31 |
| 2009/0232920 A1 | 9/2009 | Lozano et al. |
| 2009/0269429 A1 | 10/2009 | Lozano et al. |
| 2009/0280207 A1 | 11/2009 | Lozano et al. |
| 2009/0280325 A1 | 11/2009 | Lozano et al. |
| 2010/0072674 A1* | 3/2010 | Takahashi ............ D01D 5/0038 264/465 |
| 2012/0292795 A1 | 11/2012 | Peno et al. |
| 2012/0292796 A1 | 11/2012 | Peno et al. |
| 2012/0292810 A1 | 11/2012 | Peno et al. |
| 2012/0294966 A1 | 11/2012 | Peno et al. |
| 2012/0295021 A1 | 11/2012 | Peno et al. |
| 2012/0304613 A1 | 12/2012 | Peno et al. |

FOREIGN PATENT DOCUMENTS

| | | |
|---|---|---|
| WO | WO 2005/061763 A1 | 7/2005 |
| WO | WO 2007/089710 A1 | 8/2007 |

* cited by examiner

DEVICES AND METHODS FOR THE PRODUCTION OF MICROFIBERS AND NANOFIBERS HAVING ONE OR MORE ADDITIVES

PRIORITY CLAIM

This application claims the benefit of U.S. Provisional Application No. 61/680,109 filed on Aug. 6, 2012 and U.S. Provisional Application No. 61/776,054 filed on Mar. 11, 2013, both of which are incorporated herein by reference.

BACKGROUND OF THE INVENTION

1. Field of the Invention

The present invention generally relates to the field of fiber production. More specifically, the invention relates to fibers of micron and sub-micron size diameters.

2. Description of the Relevant Art

Fibers having small diameters (e.g., micrometer ("micron") to nanometer ("nano")) are useful in a variety of fields from the clothing industry to military applications. For example, in the biomedical field, there is a strong interest in developing structures based on nanofibers that provide scaffolding for tissue growth to effectively support living cells. In the textile field, there is a strong interest in nanofibers because the nanofibers have a high surface area per unit mass that provide light, but highly wear resistant, garments. As a class, carbon nanofibers are being used, for example, in reinforced composites, in heat management, and in reinforcement of elastomers. Many potential applications for small-diameter fibers are being developed as the ability to manufacture and control their chemical and physical properties improves.

It is well known in fiber manufacturing to produce extremely fine fibrous materials of organic fibers, such as described in U.S. Pat. Nos. 4,043,331 and 4,044,404, where a fibrillar mat product is prepared by electrostatically spinning an organic material and subsequently collecting spun fibers on a suitable surface; U.S. Pat. No. 4,266,918, where a controlled pressure is applied to a molten polymer which is emitted through an opening of an energy charged plate; and U.S. Pat. No. 4,323,525, where a water soluble polymer is fed by a series of spaced syringes into an electric field including an energy charged metal mandrel having an aluminum foil wrapper there around which may be coated with a PTFE (Teflon™) release agent. Attention is further directed to U.S. Pat. Nos. 4,044,404, 4,639,390, 4,657,743, 4,842,505, 5,522,879, 6,106,913 and 6,111,590—all of which feature polymer nanofiber production arrangements.

Electrospinning is a major manufacturing method to make nanofibers. Examples of methods and machinery used for electrospinning can be found, for example, in the following U.S. Pat. Nos. 6,616,435; 6,713,011; 7,083,854; and 7,134,857.

SUMMARY OF THE INVENTION

Described herein are apparatuses and methods of creating fibers, such as microfibers and nanofibers. The methods discussed herein employ centrifugal forces to transform material into fibers.

In some embodiments, a method of producing microfibers and/or nanofibers may include placing material in a fiber producing device, the material comprising a polymer and an ionizing compound. The fiber producing device includes a body comprising one or more openings and a coupling member. The body is configured to receive material to be produced into a fiber. The fiber producing device is coupled to the driver by the coupling member. The method includes rotating the fiber producing device at a speed of at least about 1000 rpm, wherein rotation of the fiber producing device causes material in the body to be passed through one or more openings, into one or more outlet elements, and ejected through one or more outlet elements to produce microfibers and/or nanofibers. At least a portion of the produced microfibers and/or nanofibers are collected using an electrically charged plate or moving belt.

Examples of ionizing compounds include, but are not limited to, ionic surfactants (e.g., anionic surfactants or cationic surfactants), organic salts (sodium carboxylate salts and amine salts), and inorganic salts (e.g., metal halide salts), ionomers (e.g., polyaniline, polythiophene, and polycarboxylic acid), and conductive carbon compounds (e.g., carbon black and carbon nanotubes).

In some embodiments, a method of producing microfibers and/or nanofibers may include placing material in a fiber producing device, the fiber producing device. The fiber producing device may include a body comprising one or more openings and a coupling member. The body may function to receive material to be produced into a fiber. The fiber producing device may be coupled to the driver by the coupling member. The material may include a first component and a second component. The method may include rotating the fiber producing device. Rotation of the fiber producing device may cause material in the body to be passed through one or more openings to produce microfibers and/or nanofibers composed of the first component and the second component. The method may include collecting at least a portion of the produced microfibers and/or nanofibers. The method may include removing at least a portion of the first component from the produced microfibers and/or nanofibers.

In some embodiments, a method of producing microfibers and/or nanofibers may include placing material in a fiber producing device, the fiber producing device. The fiber producing device may include a body comprising one or more openings and a coupling member. The body may function to receive material to be produced into a fiber. The fiber producing device may be coupled to the driver by the coupling member. The material may include one or more antimicrobial components. The method may include rotating the fiber producing device. Rotation of the fiber producing device may cause material in the body to be passed through one or more openings to produce microfibers and/or nanofibers composed of the antimicrobial component. The method may include collecting at least a portion of the produced microfibers and/or nanofibers.

In some embodiments, a method of producing microfibers and/or nanofibers may include placing material in a fiber producing device, the fiber producing device. The fiber producing device may include a body comprising one or more openings and a coupling member. The body may function to receive material to be produced into a fiber. The fiber producing device may be coupled to the driver by the coupling member. The material may include at least one nanoparticle component. The method may include rotating the fiber producing device. Rotation of the fiber producing device may cause material in the body to be passed through one or more openings to produce microfibers and/or nanofibers composed of at least one nanoparticle component. The method may include collecting at least a portion of the produced microfibers and/or nanofibers.

BRIEF DESCRIPTION OF THE DRAWINGS

Advantages of the present invention will become apparent to those skilled in the art with the benefit of the following detailed description of embodiments and upon reference to the accompanying drawings, in which.

Figure 1A:
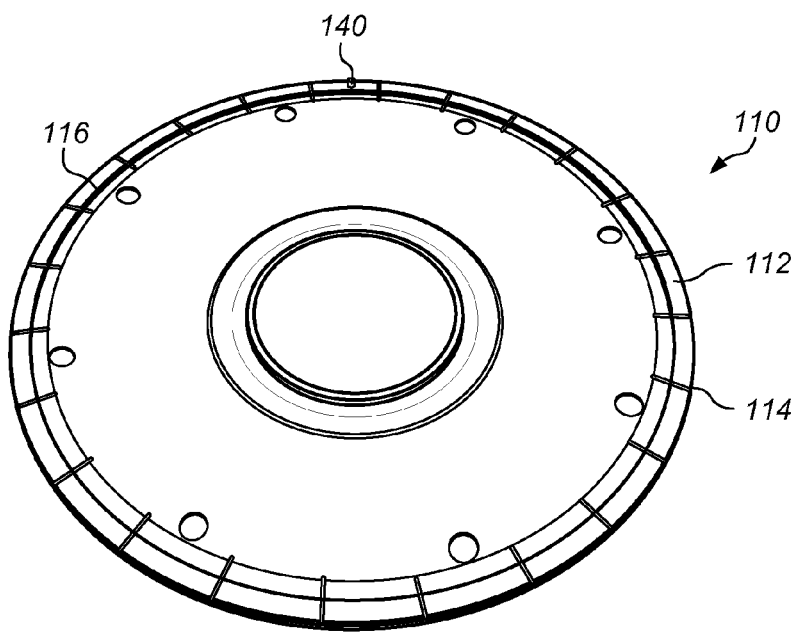
FIGS. 1A-C depict an embodiment of a fiber producing device.

While the invention may be susceptible to various modifications and alternative forms, specific embodiments thereof are shown by way of example in the drawings and will herein be described in detail. The drawings may not be to scale. It should be understood, however, that the drawings and detailed description thereto are not intended to limit the invention to the particular form disclosed, but to the contrary, the intention is to cover all modifications, equivalents, and alternatives falling within the spirit and scope of the present invention as defined by the appended claims.

DETAILED DESCRIPTION OF THE PREFERRED EMBODIMENTS

It is to be understood the present invention is not limited to particular devices or methods, which may, of course, vary. It is also to be understood that the terminology used herein is for the purpose of describing particular embodiments only, and is not intended to be limiting. As used in this specification and the appended claims, the singular forms "a", "an", and "the" include singular and plural referents unless the content clearly dictates otherwise. Furthermore, the word "may" is used throughout this application in a permissive sense (i.e., having the potential to, being able to), not in a mandatory sense (i.e., must). The term "include," and derivations thereof, mean "including, but not limited to." The term "coupled" means directly or indirectly connected.

The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a method or apparatus that "comprises," "has," "includes" or "contains" one or more steps or elements possesses those one or more steps or elements, but is not limited to possessing only those one or more steps or elements. Likewise, an element of an apparatus that "comprises," "has," "includes" or "contains" one or more features possesses those one or more features, but is not limited to possessing only those one or more features.

Described herein are apparatuses and methods of creating fibers, such as microfibers and nanofibers. The methods discussed herein employ centrifugal forces to transform material into fibers. Apparatuses that may be used to create fibers are also described. Some details regarding creating fibers using centrifugal forces may be found in the following U.S. Published Patent Applications: 2009/0280325 entitled "Methods and Apparatuses for Making Superfine Fibers" to Lozano et al.; 2009/0269429 entitled "Superfine Fiber Creating Spinneret and Uses Thereof" to Lozano et al.; 2009/0232920 entitled "Superfine Fiber Creating Spinneret and Uses Thereof" to Lozano et al.; 2009/0280207 entitled "Superfine Fiber Creating Spinneret and Uses Thereof" to Lozano et al.; 2012/0292810 entitled "Apparatuses Having Outlet Elements and Methods for the Production of Microfibers and Nanofibers" to Peno; 2012/0294966 entitled "Multilayer Apparatuses and Methods for the Production of Microfibers and Nanofibers" to Peno et al.; 2012/0295021 entitled "Apparatuses and Methods for the Deposition of Microfibers and Nanofibers on a Substrate" to Peno et al.; 2012/0292795 to entitled "Apparatuses and Methods for Simultaneous Production of Microfibers and Nanofibers" to Peno et al.; 2012/0304613 entitled "Split Fiber Producing Devices and Methods for the Production of Microfibers and Nanofibers" to Peno et al.; and 2012/0292796 entitled "Devices and Methods for the Production of Coaxial Microfibers and Nanofibers" to Peno et al.; all of which are incorporated herein by reference.

Figure 1B:
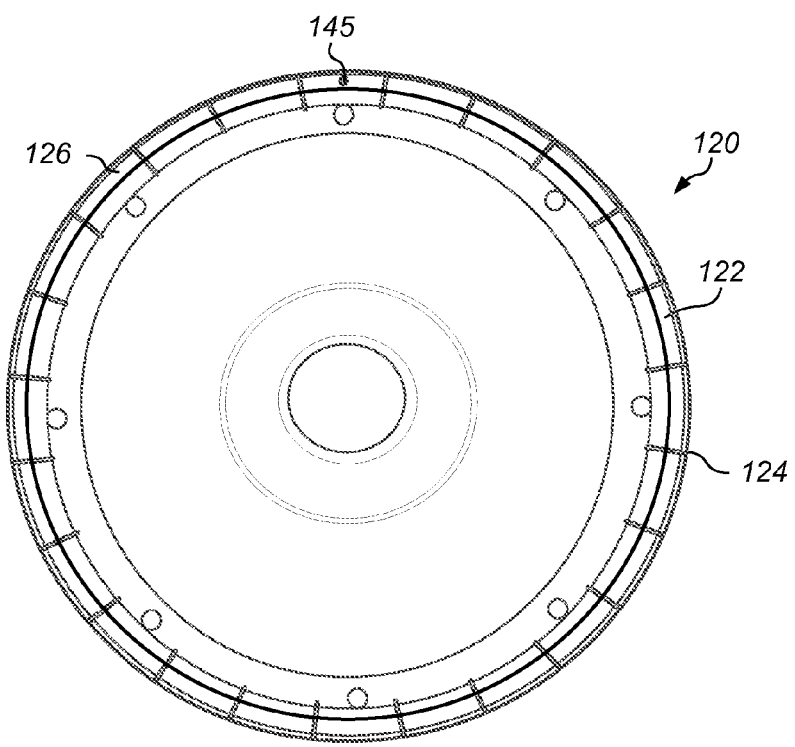
Figure 1C:
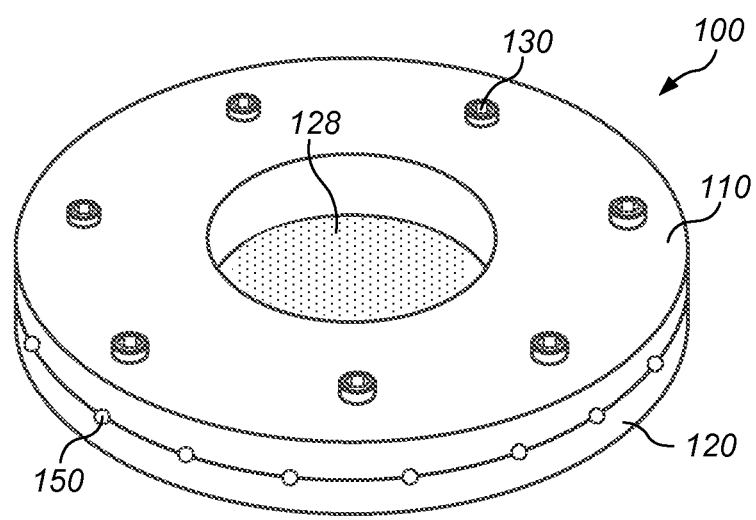

One embodiment of a fiber producing device is shown in FIGS. 1A-C. Fiber producing device 100 includes a body comprising a first member 110 (FIG. 1A) and a second member 120 (FIG. 1B). First member 110 includes a first member coupling surface 112. First member coupling surface 112 includes one or more grooves 114 extending along the width of the first member coupling surface. Second member 120 includes a second member coupling surface 122 and a coupling member 128. Second member coupling surface 122 comprises one or more grooves 124 extending along the width of the second member coupling surface. Coupling member 128 may be used to couple the body to a driver of a fiber producing system.

The body is formed by coupling first member 110 to second member 120. To couple the first and second members, first member coupling surface 112 is contacted with second member coupling surface 122. One or more fasteners 130 may be used to secure the first member and second member together. When the first member coupling surface is coupled to the second member coupling surface to form the body, the first member and the second member together define an internal cavity of the body. In one embodiment, fasteners 130 have an effect on the pattern of fiber produced by the fiber producing device. For example, the head of a fastener produces external gas currents due to the high speed of rotation of the fiber producing device. Additional components may be added on either side of the body or incorporated directly onto the surface of the body to produce external gas currents. These external gas currents can affect the pattern of fibers produced. The pattern of fibers produced by the fiber producing device may be altered by using fasteners having different head configurations. Alternatively, the position of fasteners may be altered to change the fiber deposition pattern. For example, the one or more fasteners may be left out of existing holes. Alternatively, the body may include a plurality of holes. The pattern of fibers produced by the fiber producing device may be altered by changing which of the plurality of holes are used to couple the first and second members together. In another embodiment, the height of the fasteners may be altered by loosening and or tightening the fasteners. Thus the height of the head of one or more fasteners may be varied to alter the pattern of fibers produced by the fiber producing device.

In some embodiments, it is desirable that grooves 114 of the first member are substantially aligned with groves 124 of the second member. When the grooves are aligned, the grooves together form one or more openings 150 extending from the interior cavity to an outer surface of the body. During use, rotation of the body material disposed in the internal cavity of the body is ejected through one or more openings 150 to produce microfibers and/or nanofibers. Material may be placed into the body of fiber producing through a first member opening 128 formed in first member 110. In one embodiment, first member is ring shaped and material is added to the internal cavity through a central opening of the ring shaped first member.

In order to ensure proper alignment of the first member with the second member, the first member may include a first alignment element 116 disposed on the first coupling member surface 112. The second member may include a second alignment element 126 disposed on the second member coupling surface 122. First alignment element 116 couples with second alignment element 126 when first member 110 is properly aligned with second member 120. This may help to ensure that grooves 114 and 124 are properly aligned. In one embodiment, one of the first or second alignment elements includes a projection extending form the coupling surface, and the other of the first or second alignment elements includes an indentation complementary to the projection.

In an embodiment, the first alignment element may be a first alignment ring 116 disposed on the first coupling member surface 112. The second member may include a second alignment ring 126 disposed on the second member coupling surface 122. First alignment ring 116 interlocks with second alignment ring 126 when first member 110 is properly aligned with second member 120. The interlocking first and second rings center the first member and second member with each other. In one embodiment, first and second rings interlock with each other on an angle so that the first and second members are centered to one another. Alignment is further insured by the use of a projection 140 formed in the first member which fits into a suitable indentation 145 formed in the second member. Projection 140 and indentation 145 help ensure that the first and second members are coupled in the same rotational position such that the grooves of the first and second members are aligned.

In an embodiment, where the fiber producing device is coupled to a driver positioned above the fiber producing device, the coupling member extends through the internal cavity defined by the first and second members and through the first member. Alternatively, where the fiber producing device is coupled to a driver positioned below the fiber producing device, the coupling member is coupled to an outer surface of the second member, extending away from the second member.

In some embodiments, a fiber producing device may include a body. The body may be formed such that a portion of the body may function to facilitate conveyance of produced fibers away from the body. For example, the body of a fiber producing device may include draft members which create a gas flow proximate to the fiber producing device. In some embodiments, a fiber producing device may include two or more draft members. In some embodiments, a fiber producing device may include four draft members. FIGS. 2A-B and 3A-B depict embodiments of a body of a fiber producing device with draft members. Draft members may function as blades on a fan creating a gas current. The gas current created by the draft members may facilitate movement of the produced fibers away from the fiber producing device. The gas currents may direct the produced fibers in a fiber producing system. In some embodiments, draft members may be angled out of the plane of the body of the fiber producing device. Draft members may be angled, much like blades of a fan, increasing the strength of a gas current produced by the draft members. In some embodiments, an angle of the draft members may be adjusted by a user in order to increase/decrease a strength of the gas current produced during use. Upon adjustment the draft members may be locked into place.

Figure 2A:
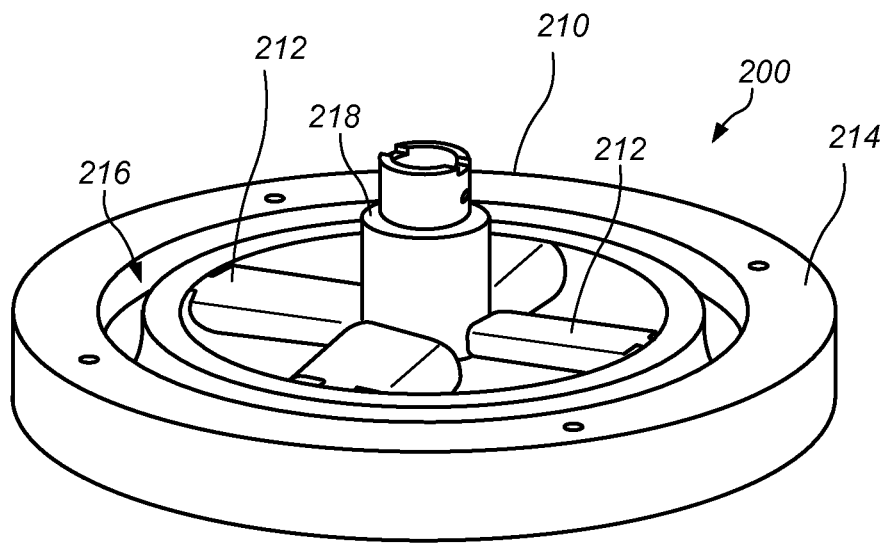
FIG. 2A depicts an embodiment of a body of a fiber producing device with four internal draft members.
Figure 2B:
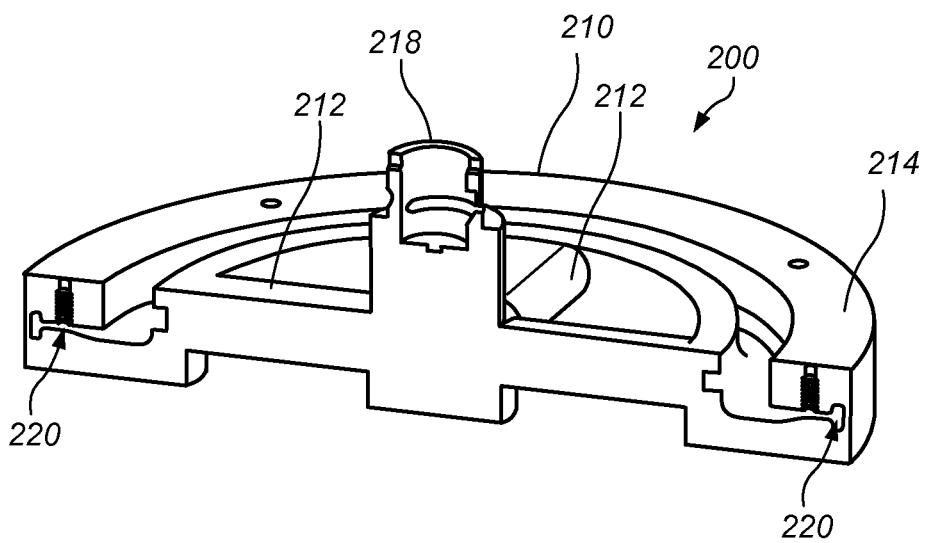
FIG. 2B depicts a cross section of an embodiment of a body of a fiber producing device with four internal draft members.

FIGS. 2A-B depict embodiments of a body of a fiber producing device 200 with draft members 212 positioned within an exterior ring portion 214 of the body of the fiber producing device. Channel 216 may function as a material input channel, wherein material is positioned in the channel before being spun out of openings in ring portion 214 and produced into fibers. As depicted in the cross section of FIG. 2B, exterior ring portion 214 may include an inclined pressure channel 220 which functions to increase the pressure of material as the material is forced out the openings in the ring portion. Inclined pressure channel 220 may include a narrowing of the channel which then widens out before the openings.

Coupling member 218 may function to couple fiber producing device 200 to a drive system of a fiber producing system. In some embodiments, a top surface of exterior ring portion 214 may be compatible with an inductive heating system.

Figure 3A:
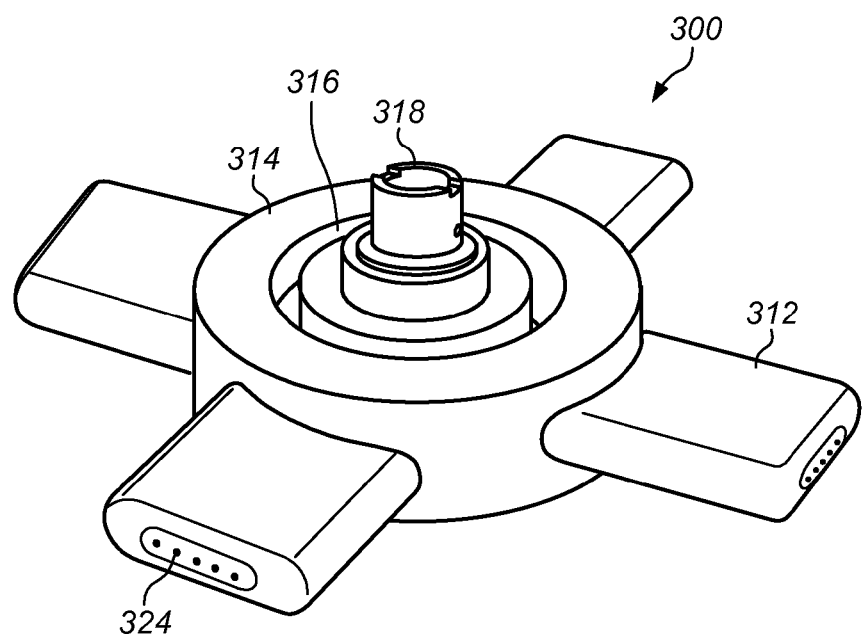
FIG. 3A depicts an embodiment of a body of a fiber producing device with four external draft members.
Figure 3B:
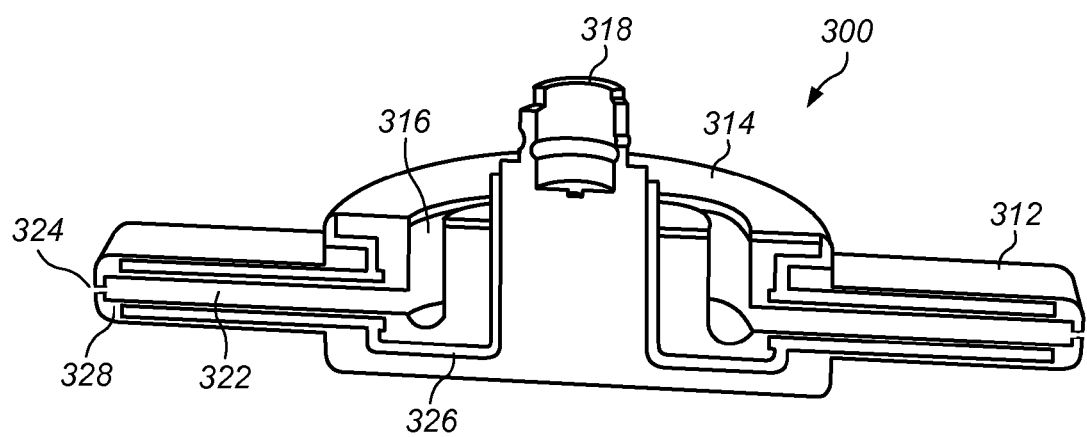
FIG. 3B depicts a cross section of an embodiment of a body of a fiber producing device with four external draft members.

FIGS. 3A-B depict an alternate embodiment of a fiber producing device 300 with draft members 312 positioned outside of a ring portion 314 of the body of the fiber producing device. Channel 316 may function as a material input channel, wherein material is positioned in the channel before being spun out of openings in members 312 and produced into fibers. As depicted in the cross section of FIG. 3B, draft members 312 may include a channel 322. Channels 322 may function to connect openings 324 with channel 316 to produce fibers during use. In some embodiments, the body may be formed from layers of insulating material 326 and heat transmitting material 328. Coupling member 318 may function to couple fiber producing device 300 to a drive system of a fiber producing system. In some embodiments, a top surface of exterior ring portion 314 may be compatible with an inductive heating system.

Figure 4A:
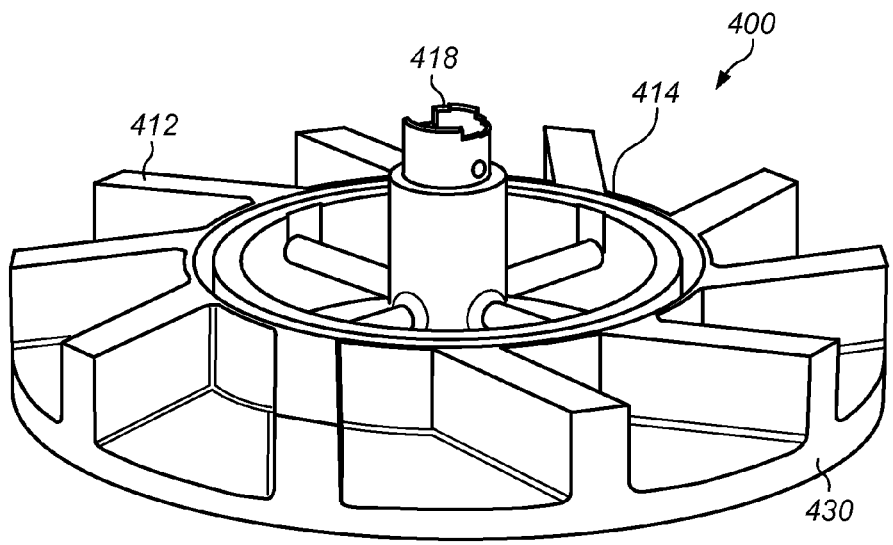
FIG. 4A depicts an embodiment of a body of a fiber producing device with a plurality of external draft members.
Figure 4B:
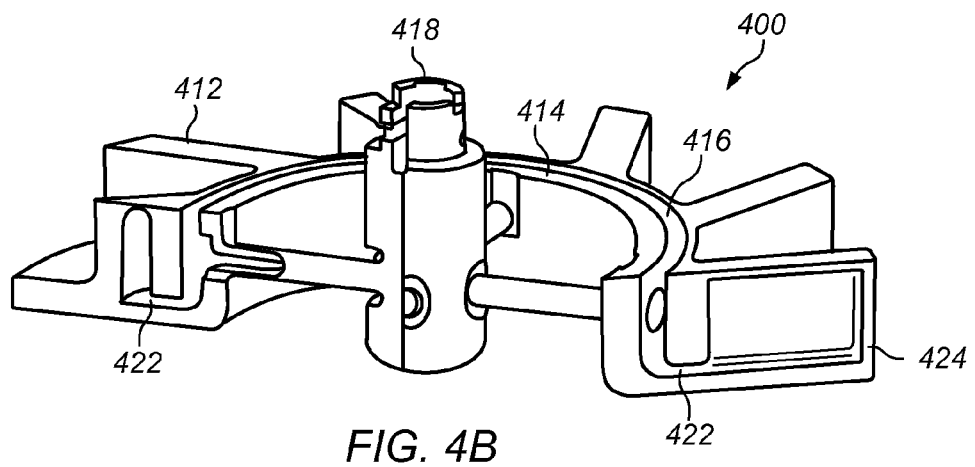
FIG. 4B depicts a cross section of an embodiment of a body of a fiber producing device with a plurality of external draft members.
Figure 4C:
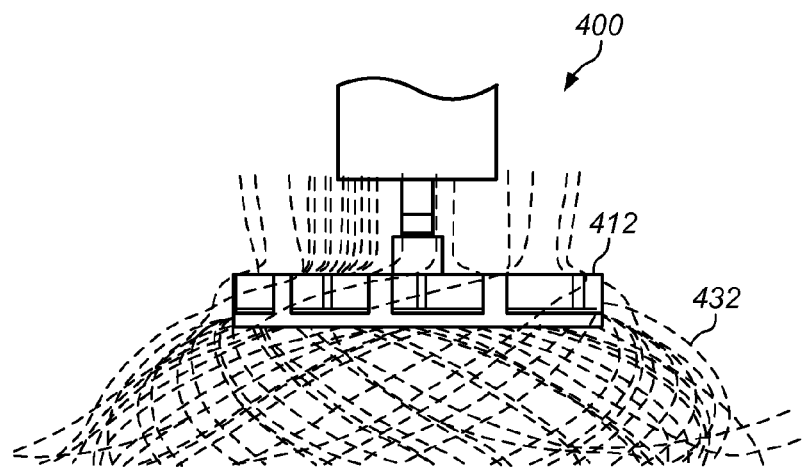
FIG. 4C depicts an embodiment of a body of a fiber producing device with a plurality of external draft members with a representation of air and/or fiber flow during use.

FIGS. 4A-C depict an alternate embodiment of a body of a fiber producing device 400 with a plurality of external draft members 412. In the depicted embodiment fiber producing device 400 includes draft members 412 positioned outside of a ring portion 414 of the body of the fiber producing device. In the depicted embodiment, draft members 412 are coupled to ring portion 414 and a support member 430. Channel 416 may function as a material input channel, wherein material is positioned in the channel (e.g., injected from a nozzle delivery system) before being spun out of openings in members 412 and produced into fibers. As depicted in the cross section of FIG. 4B, draft members 412 may include a channel 422. Channels 422 may function to connect openings 424 with channel 416 to produce fibers during use. Coupling member 418 may function to couple fiber producing device 400 to a drive system of a fiber producing system. In some embodiments, a top surface of the fiber producing device is compatible with an inductive heating system.

FIG. 4C depicts an embodiment of a body of a fiber producing device 400 with a plurality of external draft members 412 with a representation of air/fiber flow 432 during use. Draft members 412 are coupled to support member 430 forming a pattern which resembles an impeller. The plurality of support members are positioned at an angle radiating out from ring portion 414. Material may be injected into channel 416 and then flow through channels 422 in draft members 412 due to the centrifugal forces resulting from fiber producing device 400 rotating at high speeds. Material may then be ejected through openings 424 (e.g., located at the end of the draft members), resulting from the centrifugal forces, producing the fibers. The draft members produce, during use, an air current or flow which pushes the produced fibers away from fiber producing device 440 (e.g., as depicted in FIG. 4C).

Figure 5:
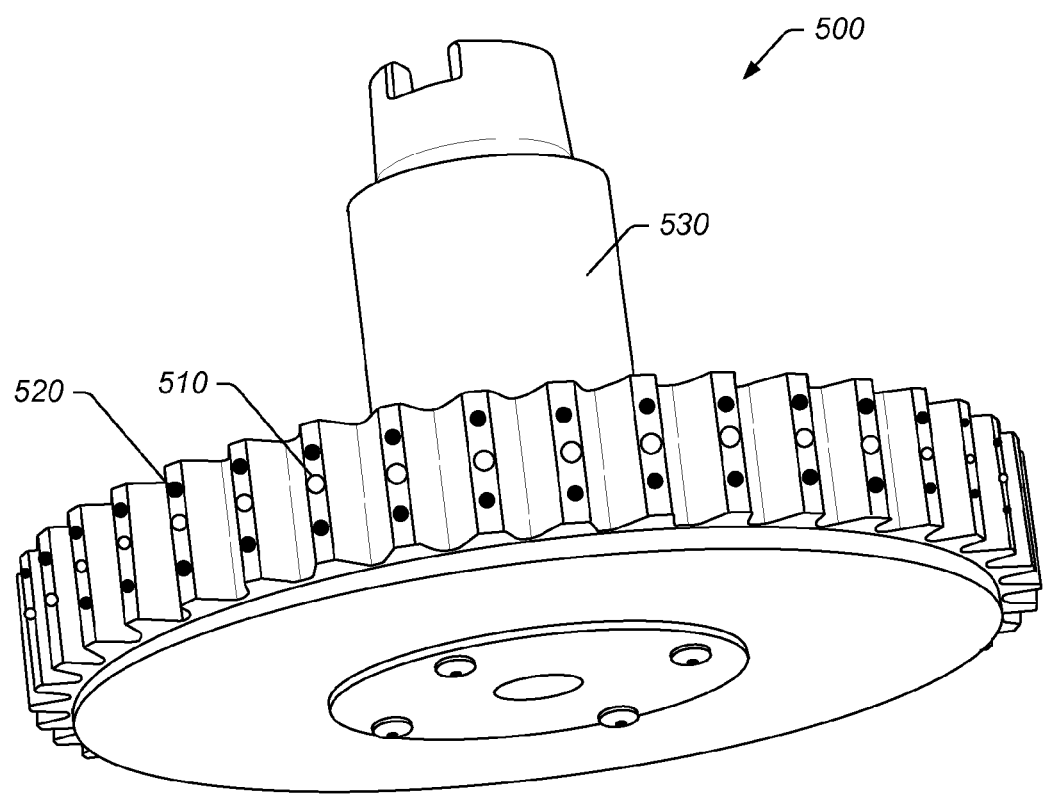
FIG. 5 depicts a perspective view of a fiber producing device comprising openings and gas outlets.

In another embodiment, a fiber producing device includes a body having one or more openings, a body cavity, and a coupling member. The body cavity is configured to receive material to be produced into a fiber. In some embodiments the body further comprising one or more gas outlets positioned proximate to the one or more openings. During use, rotation of the body causes material in the body cavity to be passed through one or more openings and ejected from one or more openings to produce microfibers and/or nanofibers, and wherein during rotation of the body, gas is passed through the gas outlets. An embodiment of a fiber producing device having such a configuration is depicted in FIG. 5. Fiber producing device 500 includes one or more openings 510 passing through the sidewalls of the body and one or more gas outlets 520 positioned proximate to one or more openings. During use, gas is ejected through one or more of the gas outlets 520, while material is ejected through one or more of the openings 510. The ejected gas can guide the ejected material away from the fiber producing device to assist with the formation of fibers.

Fiber producing device 500 includes a coupling member 530 which couples the fiber producing device to a driver. Coupling member 530 may include a central conduit which extends through coupling member 530 into the body of fiber producing device 530. Central conduit may be used to introduce material directly into the body of fiber producing device 500. In some embodiments, central conduit may also include a gas inlet that allows inert gas to be passed into the fiber producing device. Central conduit may include two or more lumens which are coupled to the fiber producing device. A first lumen may be used to introduce material into the body to be converted to fibers. A second lumen may be used to pass gas into the fiber producing device. Second lumen may be coupled to a portion of the fiber producing device 500 such that gas passes into fiber producing device 500 and out through gas outlets 520, while being inhibited from entering the body which holds the material. First lumen, in a similar manner, may be coupled to a portion of the fiber producing device 500 such that material passes into the body of fiber producing device 500 and out through openings 510, while being inhibited from entering gas outlets 520. In applications that use a heated material for fiber production, gas entering the fiber producing device may be heated such that heated gas, preferably at or near the temperature of the heated material, is ejected from the fiber producing device.

Figure 6:
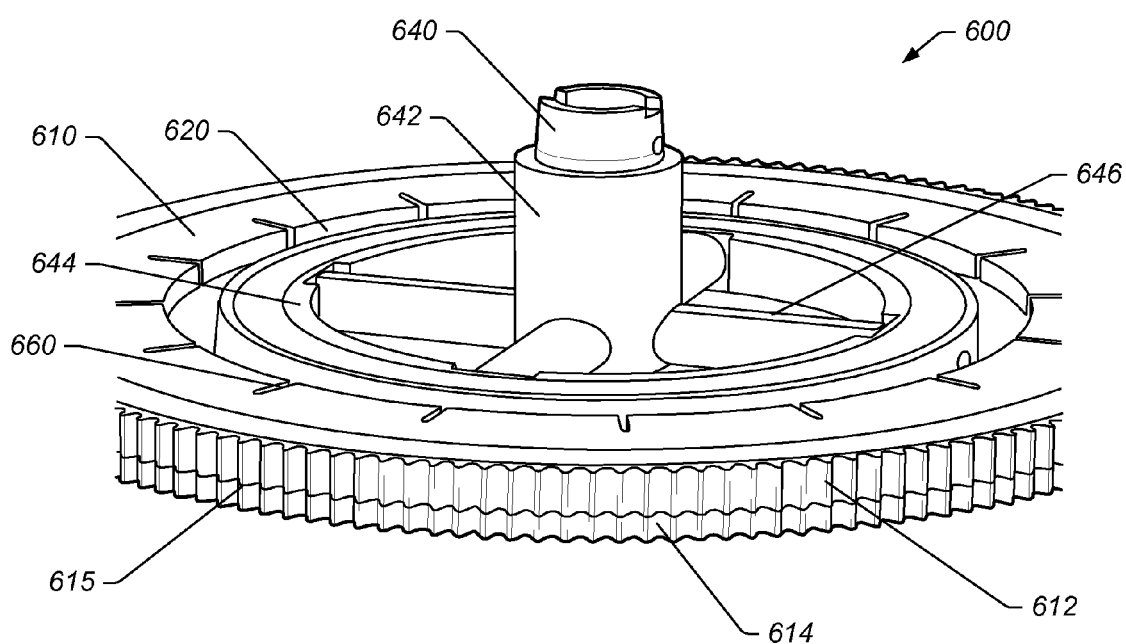
FIG. 6 depicts an alternate version of a gear fiber producing device.

FIG. 6 depicts a projection view of another embodiment of a fiber producing device. Fiber producing device 600 includes a gear like body 610, having a plurality of orifices disposed in groove 615 of each gear like extension. Body 610 may be composed of a top member 612 and a bottom member 614. When coupled together top member 612 and bottom member 614 define groove 615, which run around the circumference of the fiber producing device. Top member 612 and bottom member 614 together define a body cavity (not shown), in which the material to be formed into fibers is disposed. An opening 620 extends through top member 612 to the body cavity to allow material to be placed into body cavity. Use of a channel that couples directly to the body cavity allows introduction of the material from the top face of the body while the body is being rotated. Fiber producing device 600 is coupled to a drive using coupling member 640. Coupling member, in some embodiments, has an open hub design. An open hub design features a central coupler 642 which is connected to a coupling ring 644 through one or more arms 646, leaving a substantially empty area between the central coupler and the coupling ring. This open hub design helps improve air flow management around the fiber producing device.

Fiber producing devices may be heated by induction, as described herein. Induction produces currents in the body of the fiber producing device which heats the device. It is often desirable to control the location of the heating by steering the induced currents to the regions where heat is desired. In FIG. 6, a fiber producing device has radial slots 660 cut in the upper plate to push induced circumferential currents to the outer diameters of the device.

When material is ejected from an opening during spinning of a fiber producing body, the material tends to expand as it leaves an opening. It has been found that by "setting" the diameter of the material prior to the material exiting the fiber producing device, expansion of the material as it leaves the fiber producing device may be minimized. To "set" the diameter of the material an annular passageway is formed through the sidewall of the body having a substantially constant diameter. Holding the material at a constant diameter over a predetermined length, sets the diameter of the material, reducing the expansion of the material as it exits the outlet conduit and nozzle. Reduction of swelling helps to improve the consistency of the produced fibers with regard to size and length. The length and/or diameter of annular passage may be selected based, at least in part, on the type of material being used. Generally, as the viscosity of the material increases, a longer conduit may be used to properly set the diameter of the material before the material exits the fiber producing device.

The conditions of the environment in which fibers are created may influence various properties of those fibers. For example, some metallic fibers, such as iron fibers, react with ambient air (becoming converted to iron oxides). For such applications, it is preferable to replace ambient air with an inert gas (e.g., nitrogen, helium, argon). Humid conditions may detrimentally affect the surfaces of many polymeric fibers, such as poly (ethylene oxide) (PEO) fibers. Thus, lowering humidity levels is preferable for processing of some materials. Similarly, drugs may be required to be developed under sterile conditions that are not maintained in ambient conditions, a sterile environment is therefore preferred in such situations.

The "environment" refers to the interior space defined by the housing that surrounds the components of a fiber producing device. For certain uses, the environment may simply be ambient air. Air may be blown into the environment, if desired. For other uses, the environment may be subjected to low-pressure conditions, such as from about 1 mm Hg to about 760 mm Hg, or any range derivable therein using, for example, a vacuum pump. Alternatively, the environment may be subjected to high-pressure conditions, such as conditions ranging from 761 mm Hg up to 4 atm or higher using, for example, a high pressure pump. The temperature of the environment may be lowered or raised, as desired, through the use of heating and/or cooling systems, which are described below. The humidity level of the environment may be altered using a humidifier, and may range from 0% to 100% humidity. For certain applications, such as drug development, the environment may be rendered sterile. If the components of an apparatus are each made of, for example, stainless steel, all components may be individually sterilized and assembled, such as in a clean room under conditions that maintain the sterility of the apparatus.

Several types of heating and cooling sources may be used in apparatuses and methods as discussed herein to independently control the temperature of, for example, a fiber producing device, a material, and/or the environment within an apparatus. Examples of heat sources that may be employed include resistance heaters, inductive heaters and radiant heaters (e.g. infrared heaters). Peltier or Thermoelectric Cooling (TEC) devices may be used for heating and/or cooling purposes. Cold gas or heated gas (e.g., air or nitrogen) may also be pumped into the environment for cooling or heating purposes. Conductive, convective, or radiation heat transfer mechanisms may be used for heating and cooling of various components of the apparatuses.

Components of apparatuses may be made from a variety of materials. In certain embodiments, the components of an apparatus may be made from stainless steel. For example, the fiber producing device, collection wall and housing may each be made from stainless steel. In this situation, the components may be used for, e.g., low melting metals like tin (232° C.), zinc (420° C.), silver (962° C.) and alloys thereof. In certain embodiments, ceramic components may be used for high melting alloys, such as gold (1064° C.) and nickel (1453° C.). Manipulation of high melting alloys may require blanketing the environment of the components with an inert gas, such as nitrogen or helium, with appropriate sealing of the housing.

In certain methods described herein, material spun in a fiber producing device may undergo varying strain rates, where the material is kept as a melt or solution. Since the strain rate alters the mechanical stretching of the fibers created, final fiber dimension and morphology may be significantly altered by the strain rate applied. Strain rates are affected by, for example, the shape, size, type and RPM of a fiber producing device. Altering the viscosity of the material, such as by increasing or decreasing its temperature or adding additives (e.g., thinner), may also impact strain rate. Strain rates may be controlled by a variable speed fiber producing device. Strain rates applied to a material may be varied by, for example, as much as 50-fold (e.g., 1000 rpm to 25,000 RPM).

Temperatures of the material, fiber producing device and the environment may be independently controlled using a control system. The temperature value or range of temperatures employed typically depends on the intended application. For example, for many applications, temperatures of the material, fiber producing device and the environment typically range from −4° C. to 400° C. Temperatures may range as low as, for example, −20° C. to as high as, for example, 2500 C. For melt spinning of polymers, a fiber producing device may be kept at a temperature of up to 400° C. For melt spinning involving metals, a fiber producing device may be kept at temperatures of 450° C. or higher. For solution spinning, ambient temperatures of the fiber producing device are typically used. In drug development studies the temperature of the fiber producing device may be between, for example, 4° C. and 80° C. When producing ceramic or metal fibers, the temperatures utilized may be significantly higher. For higher temperatures, it will typically be necessary to make appropriate changes in the materials of the housing of an apparatus and/or the interior components (e.g., substitution of metal for plastic), or in the apparatus itself (e.g., addition of insulation). Such changes may also help avoid undesirable reactions, such as oxidation.

Fibers represent a class of materials that are continuous filaments or that are in discrete elongated pieces, similar to lengths of thread. Fibers are of great importance in the biology of both plants and animals, e.g., for holding tissues together. Human uses for fibers are diverse. For example, fibers may be spun into filaments, thread, string, or rope. Fibers may also be used as a component of composite materials. Fibers may also be matted into sheets to make products such as paper or felt. Fibers are often used in the manufacture of other materials.

Fibers as discussed herein may be created using, for example, a solution spinning method or a melt spinning method. In both the melt and solution spinning methods, a material may be put into a fiber producing device which is spun at various speeds until fibers of appropriate dimensions are made. The material may be formed, for example, by melting a solute or may be a solution formed by dissolving a mixture of a solute and a solvent. Any solution or melt familiar to those of ordinary skill in the art may be employed. For solution spinning, a material may be designed to achieve a desired viscosity, or a surfactant may be added to improve flow, or a plasticizer may be added to soften a rigid fiber. In melt spinning, solid particles may comprise, for example, a metal or a polymer, wherein polymer additives may be combined with the latter. Certain materials may be added for alloying purposes (e.g., metals) or adding value (such as antioxidant or colorant properties) to the desired fibers.

Non-limiting examples of reagents that may be melted, or dissolved or combined with a solvent to form a material for melt or solution spinning methods include polyolefin, polyacetal, polyamide, polyester, cellulose ether and ester (e.g., cellulose acetate, cellulose diacetate, cellulose triacetate, etc.), polyalkylene sulfide, polyarylene oxide, polysulfone, modified polysulfone polymers and mixtures thereof. Non-limiting examples of solvents that may be used include oils, lipids and organic solvents such as DMSO, toluene and alcohols. Water, such as de-ionized water, may also be used as a solvent. For safety purposes, non-flammable solvents are preferred.

In some embodiments, fibers may be produced using a composition of two or more materials. There are a number of advantages for combining two or more materials. At least one advantage is creating a fiber with at least some of the properties from both materials. In some embodiments, at least one of the materials may include a first material which is traditionally difficult to form into fibers. To facilitate formation of fibers using such compounds, another second material may be combined with the first material to facilitate formation of a fiber. The second material may include materials which are more easily formed into fibers. The second material may include materials which facilitate the formation of fibers using the first material. The second material may include exemplary materials discussed herein.

In some embodiments, the second material may include a sacrificial material which is removed from the fibers after formation of the fibers. The second material facilitates formation of the first material into fibers and then at least a portion, a majority, or substantially all of the second material may be removed. After the second material is removed from the produced fibers, the produced fibers remain formed from the first material and any other remaining materials not removed (e.g., the first material may actually be a combination of two or more materials).

In some embodiments, a second "sacrificial" material may be removed from a produced fiber. The second material may be removed from the produced fiber using one or more different methods. In some embodiments, the second material may be removed from the produced fibers using one or more solvents. Solvents may be used which are capable of dissolving the second material but from which the first material are resistant to being dissolved by the chosen solvent.

In some embodiments, a second material may be removed from a produced fiber using heat to remove the second material. Heat may be used to melt and/or decompose the second material to remove the second material from the produced fibers. Heat may be used in combination with other elements to remove a second material from produced fibers. In some embodiments, heat may be used in combination with gases to facilitate decomposition. Oxygen may be used in combination with heat to promote oxidation and the resulting decomposition of the second material. In some instances a process such as described may be known as calcination. Calcination is a thermal treatment process in presence of air applied to solid materials to bring about thermal decomposition, phase transition, or removal of a volatile fraction of the solid material. The calcination process normally takes place at temperatures below the melting point of the materials. Calcination is distinguishable from roasting, in which more complex gas-solid reactions take place between the furnace atmosphere and the solids. In some embodiments, elevated and/or reduced pressure may be use to facilitate removal of a second material. In some embodiments, elevated pressure may facilitate decomposition of a second material. In some embodiments, reduced pressure may be used facilitate removal of a second material.

In some embodiments, a first material may include materials which are traditionally difficult to form into fibers. First materials may include, for example, Teflon fibers, carbon fibers, ceramic fibers, etc. Different methods may be used to form such fibers including, but not limited to, solvent based and melt based force spinning production methods which are further detailed in International Appl. No.: PCT/US12/28503 to Lozano et al., filed Mar. 9, 2012, entitled "Apparatuses and Methods for the Production of Fibers," which is incorporated by reference fully herein.

In some embodiments, fibers may be produced using two or more different materials. An advantage is creating a fiber with at least some of the properties from both materials. In some embodiments, metals may incorporated into compositions used to make fibers. Metal incorporated into fibers may include zirconium, lead, silver, and/or selenium. Metals such as these may provide different properties to the produced fibers providing additional advantages and uses. For example, silver and/or selenium may be incorporated into produced fibers in order to add antimicrobial properties to produced fibers. Such fibers may be added to material used by hospitals for example in order to inhibit and/or ameliorate the diseases. Different types of materials may be incorporated into the fibers as demonstrated. In some embodiments, nanoparticles (e.g., metals, carbon black, nanotubes, etc.) may be incorporated into fibers. In some embodiments, nanoparticles of metal may be incorporated into fibers.

In either the solution or melt spinning method, as the material is ejected from the spinning fiber producing device, thin jets of the material are simultaneously stretched and dried or stretched and cooled in the surrounding environment. Interactions between the material and the environment at a high strain rate (due to stretching) leads to solidification of the material into fibers, which may be accompanied by evaporation of solvent. By manipulating the temperature and strain rate, the viscosity of the material may be controlled to manipulate the size and morphology of the fibers that are created. A wide variety of fibers may be created using the present methods, including novel fibers such as polypropylene (PP) nanofibers. Non-limiting examples of fibers made using the melt spinning method include polypropylene, acrylonitrile butadiene styrene (ABS) and nylon. Non-limiting examples of fibers made using the solution spinning method include polyethylene oxide (PEO) and beta-lactams.

The creation of fibers may be done in batch modes or in continuous modes. In the latter case, material can fed continuously into the fiber producing device and the process can be continued over days (e.g., 1-7 days) and even weeks (e.g., 1-4 weeks).

The methods discussed herein may be used to create, for example, nanocomposites and functionally graded materials that can be used for fields as diverse as, for example, drug delivery and ultrafiltration (such as electrets). Metallic and ceramic nanofibers, for example, may be manufactured by controlling various parameters, such as material selection and temperature. At a minimum, the methods and apparatuses discussed herein may find application in any industry that utilizes micro- to nano-sized fibers and/or micro- to nano-sized composites. Such industries include, but are not limited to, material engineering, mechanical engineering, military/defense industries, biotechnology, medical devices, tissue engineering industries, food engineering, drug delivery, electrical industries, or in ultrafiltration and/or microelectric mechanical systems (MEMS).

Some embodiments of a fiber producing device may be used for melt and/or solution processes. Some embodiments of a fiber producing device may be used for making organic and/or inorganic fibers. With appropriate manipulation of the environment and process, it is possible to form fibers of various configurations, such as continuous, discontinuous, mat, random fibers, unidirectional fibers, woven and nonwoven, as well as fiber shapes, such as circular, elliptical and rectangular (e.g., ribbon). Other shapes are also possible. The produced fibers may be single lumen or multi-lumen.

By controlling the process parameters, fibers can be made in micron, sub-micron and nano-sizes, and combinations thereof. In general, the fibers created will have a relatively narrow distribution of fiber diameters. Some variation in diameter and cross-sectional configuration may occur along the length of individual fibers and between fibers.

Generally speaking, a fiber producing device helps control various properties of the fibers, such as the cross-sectional shape and diameter size of the fibers. More particularly, the speed and temperature of a fiber producing device, as well as the cross-sectional shape, diameter size and angle of the outlets in a fiber producing device, all may help control the cross-sectional shape and diameter size of the fibers. Lengths of fibers produced may also be influenced by the choice of fiber producing device used.

The temperature of the fiber producing device may influence fiber properties, in certain embodiments. Both resistance and inductance heaters may be used as heat sources to heat a fiber producing device. In certain embodiments, the fiber producing device is thermally coupled to a heat source that may be used to adjust the temperature of the fiber producing device before spinning, during spinning, or both before spinning and during spinning. In some embodiments, the fiber producing device is cooled. For example, a fiber producing device may be thermally coupled to a cooling source that can be used to adjust the temperature of the fiber producing device before spinning, during spinning, or before and during spinning. Temperatures of a fiber producing device may range widely. For example, a fiber producing device may be cooled to as low as −20 C or heated to as high as 2500 C. Temperatures below and above these exemplary values are also possible. In certain embodiments, the temperature of a fiber producing device before and/or during spinning is between about 4° C. and about 400° C. The temperature of a fiber producing device may be measured by using, for example, an infrared thermometer or a thermocouple.

The speed at which a fiber producing device is spun may also influence fiber properties. The speed of the fiber producing device may be fixed while the fiber producing device is spinning, or may be adjusted while the fiber producing device is spinning. Those fiber producing devices whose speed may be adjusted may, in certain embodiments, be characterized as variable speed fiber producing devices. In the methods described herein, the fiber producing device may be spun at a speed of about 500 RPM to about 25,000 RPM, or any range derivable therein. In certain embodiments, the fiber producing device is spun at a speed of no more than about 50,000 RPM, about 45,000 RPM, about 40,000 RPM, about 35,000 RPM, about 30,000 RPM, about 25,000 RPM, about 20,000 RPM, about 15,000 RPM, about 10,000 RPM, about 5,000 RPM, or about 1,000 RPM. In certain embodiments, the fiber producing device is rotated at a rate of about 5,000 RPM to about 25,000 RPM.

In an embodiment, a method of creating fibers, such as microfibers and/or nanofibers, includes: heating a material; placing the material in a heated fiber producing device; and, after placing the heated material in the heated fiber producing device, rotating the fiber producing device to eject material to create nanofibers from the material. In some embodiments, the fibers may be microfibers and/or nanofibers. A heated fiber producing device is a structure that has a temperature that is greater than ambient temperature. "Heating a material" is defined as raising the temperature of that material to a temperature above ambient temperature. "Melting a material" is defined herein as raising the temperature of the material to a temperature greater than the melting point of the material, or, for polymeric materials, raising the temperature above the glass transition temperature for the polymeric material. In alternate embodiments, the fiber producing device is not heated. Indeed, for any embodiment that employs a fiber producing device that may be heated, the fiber producing device may be used without heating. In some embodiments, the fiber producing device is heated but the material is not heated. The material becomes heated once placed in contact with the heated fiber producing device. In some embodiments, the material is heated and the fiber producing device is not heated. The fiber producing device becomes heated once it comes into contact with the heated material.

A wide range of volumes/amounts of material may be used to produce fibers. In addition, a wide range of rotation times may also be employed. For example, in certain embodiments, at least 5 milliliters (mL) of material are positioned in a fiber producing device, and the fiber producing device is rotated for at least about 10 seconds. As discussed above, the rotation may be at a rate of about 500 RPM to about 25,000 RPM, for example. The amount of material may range from mL to liters (L), or any range derivable therein. For example, in certain embodiments, at least about 50 mL to about 100 mL of the material are positioned in the fiber producing device, and the fiber producing device is rotated at a rate of about 500 RPM to about 25,000 RPM for about 300 seconds to about 2,000 seconds. In certain embodiments, at least about 5 mL to about 100 mL of the material are positioned in the fiber producing device, and the fiber producing device is rotated at a rate of 500 RPM to about 25,000 RPM for 10-500 seconds. In certain embodiments, at least 100 mL to about 1,000 mL of material is positioned in the fiber producing device, and the fiber producing device is rotated at a rate of 500 RPM to about 25,000 RPM for about 100 seconds to about 5,000 seconds. Other combinations of amounts of material, RPMs and seconds are contemplated as well.

Fibers may also be formed using a continuous process. For example, a fiber producing device may hold between about 50 mL to about 1000 mL of material. As the material is spun into a fiber, additional material may be added to the fiber producing device using material transfer conduits, as described herein, to maintain a predefined amount of material in the fiber producing device. IN this manner continuous processing of fibers may be achieved.

Typical dimensions for fiber producing devices are in the range of several inches in diameter and in height. In some embodiments, a fiber producing device has a diameter of between about 1 inch to about 60 inches, from about 2 inches to about 30 inches, or from about 5 inches to about 25 inches. The height of the fiber producing device may range from about 5 inches to about 10 inches, from about 2 inches to about 8 inches, or from about 3 inches to about 5 inches.

In certain embodiments, fiber producing device includes at least one opening and the material is extruded through the opening to create the nanofibers. In certain embodiments, the fiber producing device includes multiple openings and the material is extruded through the multiple openings to create the nanofibers. These openings may be of a variety of shapes (e.g., circular, elliptical, rectangular, square) and of a variety of diameter sizes (e.g., 0.01-0.80 mm). When multiple openings are employed, not every opening need be identical to another opening, but in certain embodiments, every opening is of the same configuration. Some opens may include a divider that divides the material, as the material passes through the openings. The divided material may form multi-lumen fibers.

Figure 7:
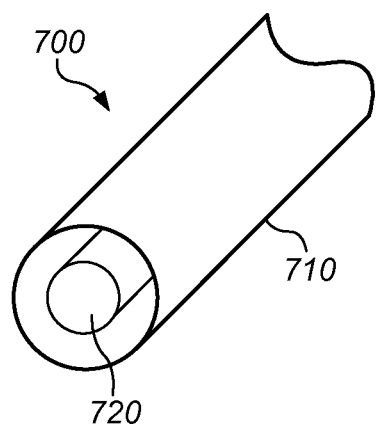
FIG. 7 depicts a coaxial outlet element.

In one embodiment, coaxial fibers may be produced using an outlet element having a two or more coaxial conduits coupled to an opening of a fiber producing device. FIG. 7 depicts an outlet element 700 having an outer conduit 710 and an inner conduit 720. The inner conduit 720 is sized and positioned inside of the outer conduit 710 such that the material may flow through the inner conduit and the outer conduit during use. The outlet element 700 depicted in FIG. 2 may be part of a needle or nozzle (e.g., a nozzle tip). The use of an outlet element 700 having coaxial conduits allows the formation of coaxial fibers. Different materials may be passed through each of conduits 710/720 to produce fibers of mixed materials in which an inner fiber (produced from the inner conduit) is at least partially surrounded by an outer fiber (produced from the outer conduit). The formation of coaxial fibers may allow fibers to be formed having different properties that are selectable based on the materials used to form the fibers. Alternatively, the same material passes through each of conduits 710/720 forming a coaxial fiber formed from the same material.

In an embodiment, material may be positioned in a reservoir of a fiber producing device. The reservoir may, for example, be defined by a concave cavity of the heated structure. In certain embodiments, the heated structure includes one or more openings in communication with the concave cavity. The fibers are extruded through the opening while the fiber producing device is rotated about a spin axis. The one or more openings have an opening axis that is not parallel with the spin axis. The fiber producing device may include a body that includes the concave cavity and a lid positioned above the body.

Another fiber producing device variable includes the material(s) used to make the fiber producing device. Fiber producing devices may be made of a variety of materials, including metals (e.g., brass, aluminum, stainless steel) and/or polymers. The choice of material depends on, for example, the temperature the material is to be heated to, or whether sterile conditions are desired.

Any method described herein may further comprise collecting at least some of the microfibers and/or nanofibers that are created. As used herein "collecting" of fibers refers to fibers coming to rest against a fiber collection device. After the fibers are collected, the fibers may be removed from a fiber collection device by a human or robot. A variety of methods and fiber (e.g., nanofiber) collection devices may be used to collect fibers.

Regarding the fibers that are collected, in certain embodiments, at least some of the fibers that are collected are continuous, discontinuous, mat, woven, nonwoven or a mixture of these configurations. In some embodiments, the fibers are not bundled into a cone shape after their creation. In some embodiments, the fibers are not bundled into a cone shape during their creation. In particular embodiments, fibers are not shaped into a particular configuration, such as a cone figuration, using gas, such as ambient air, that is blown onto the fibers as they are created and/or after they are created.

Present method may further comprise, for example, introducing a gas through an inlet in a housing, where the housing surrounds at least the heated structure. The gas may be, for example, nitrogen, helium, argon, or oxygen. A mixture of gases may be employed, in certain embodiments.

The environment in which the fibers are created may comprise a variety of conditions. For example, any fiber discussed herein may be created in a sterile environment. As used herein, the term "sterile environment" refers to an environment where greater than 99% of living germs and/or microorganisms have been removed. In certain embodiments, "sterile environment" refers to an environment substantially free of living germs and/or microorganisms. The fiber may be created, for example, in a vacuum. For example the pressure inside a fiber producing system may be less than ambient pressure. In some embodiments, the pressure inside a fiber producing system may range from about 1 millimeters (mm) of mercury (Hg) to about 700 mm Hg. In other embodiments, the pressure inside a fiber producing system may be at or about ambient pressure. In other embodiments, the pressure inside a fiber producing system may be greater than ambient pressure. For example the pressure inside a fiber producing system may range from about 800 mm Hg to about 4 atmospheres (atm) of pressure, or any range derivable therein.

In certain embodiments, the fiber is created in an environment of 0-100% humidity, or any range derivable therein. The temperature of the environment in which the fiber is created may vary widely. In certain embodiments, the temperature of the environment in which the fiber is created can be adjusted before operation (e.g., before rotating) using a heat source and/or a cooling source. Moreover, the temperature of the environment in which the fiber is created may be adjusted during operation using a heat source and/or a cooling source. The temperature of the environment may be set at sub-freezing temperatures, such as $-20°$ C., or lower. The temperature of the environment may be as high as, for example, $2500°$ C.

The material employed may include one or more components. The material may be of a single phase (e.g., solid or liquid) or a mixture of phases (e.g., solid particles in a liquid). In some embodiments, the material includes a solid and the material is heated. The material may become a liquid upon heating. In another embodiment, the material may be mixed with a solvent. As used herein a "solvent" is a liquid that at least partially dissolves the material. Examples of solvents include, but are not limited to, water and organic solvents. Examples of organic solvents include, but are not limited to: hexanes, ether, ethyl acetate, acetone, dichloromethane, chloroform, toluene, xylenes, petroleum ether, dimethylsulfoxide, dimethylformamide, or mixtures thereof. Additives may also be present. Examples of additives include, but are not limited to: thinners, surfactants, plasticizers, or combinations thereof.

The material used to form the fibers may include at least one polymer. Polymers that may be used include conjugated polymers, biopolymers, water soluble polymers, and particle infused polymers. Examples of polymers that may be used include, but are not limited to polypropylenes, polyethylenes, polyolefins, polystyrenes, polyesters, fluorinated polymers (fluoropolymers), polyamides, polyaramids, acrylonitrile butadiene styrene, nylons, polycarbonates, betalactams, block copolymers or any combination thereof. The polymer may be a synthetic (man-made) polymer or a natural polymer. The material used to form the fibers may be a composite of different polymers or a composite of a medicinal agent combined with a polymeric carrier. Specific polymers that may be used include, but are not limited to chitosan, nylon, nylon-6, polybutylene terephthalate (PBT), polyacrylonitrile (PAN), poly(lactic acid) (PLA), poly(lactic-co-glycolic acid) (PLGA), polyglycolic acid (PGA), polyglactin, polycaprolactone (PCL), silk, collagen, poly (methyl methacrylate) (PMMA), polydioxanone, polyphenylene sulfide (PPS); polyethylene terephthalate (PET), polytetrafluoroethylene (PTFE), polyvinylidene fluoride (PVDF), polypropylene (PP), polyethylene oxide (PEO), acrylonitrile butadiene, styrene (ABS), and polyvinylpyrrolidone (PVP). These polymers may be processed as either a melt or as a solution in a suitable solvent.

In another embodiment, the material used to form the fibers may be a metal, ceramic, or carbon-based material. Metals employed in fiber creation include, but are not limited to, bismuth, tin, zinc, silver, gold, nickel, aluminum, or combinations thereof. The material used to form the fibers may be a ceramic such as alumina, titania, silica, zirconia, or combinations thereof. The material used to form the fibers may be a composite of different metals (e.g., an alloy such as nitonol), a metal/ceramic composite or ceramic oxides (e.g., PVP with germanium/palladium/platinum).

The fibers that are created may be, for example, one micron or longer in length. For example, created fibers may be of lengths that range from about 1 μm to about 50 cm, from about 100 μm to about 10 cm, or from about 1 mm to about 1 cm. In some embodiments, the fibers may have a narrow length distribution. For example, the length of the fibers may be between about 1 μm to about 9 μm, between about 1 mm to about 9 mm, or between about 1 cm to about 9 cm. In some embodiments, when continuous methods are performed, fibers of up to about 10 meters, up to about 5 meters, or up to about 1 meter in length may be formed.

In certain embodiments, the cross-section of the fiber may be circular, elliptical or rectangular. Other shapes are also possible. The fiber may be a single-lumen fiber or a multi-lumen fiber.

In another embodiment of a method of creating a fiber, the method includes: spinning material to create the fiber; where, as the fiber is being created, the fiber is not subjected to an externally-applied electric field or an externally-applied gas; and the fiber does not fall into a liquid after being created.

Fibers discussed herein are a class of materials that exhibit an aspect ratio of at least 100 or higher. The term "microfiber" refers to fibers that have a minimum diameter in the range of 10 microns to 700 nanometers, or from 5 microns to 800 nanometers, or from 1 micron to 700 nanometers. The term "nanofiber" refers to fibers that have a minimum diameter in the range of 500 nanometers to 1 nanometer; or from 250 nanometers to 10 nanometers, or from 100 nanometers to 20 nanometers.

While typical cross-sections of the fibers are circular or elliptic in nature, they can be formed in other shapes by controlling the shape and size of the openings in a fiber producing device (described below). Fibers may include a blending of multiple materials. Fibers may also include holes (e.g., lumen or multi-lumen) or pores. Multi-lumen fibers may be achieved by, for example, designing one or more exit openings to possess concentric openings. In certain embodiments, such openings may include split openings (that is, wherein two or more openings are adjacent to each other; or, stated another way, an opening possesses one or more dividers such that two or more smaller openings are made). Such features may be utilized to attain specific physical properties, such as thermal insulation or impact absorbance (resilience). Nanotubes may also be created using methods and apparatuses discussed herein.

Fibers may be analyzed via any means known to those of skill in the art. For example, Scanning Electron Microscopy (SEM) may be used to measure dimensions of a given fiber. For physical and material characterizations, techniques such as differential scanning calorimetry (DSC), thermal analysis (TA) and chromatography may be used.

In particular embodiments, a fiber of the present fibers is not a lyocell fiber. Lyocell fibers are described in the literature, such as in U.S. Pat. Nos. 6,221,487, 6,235,392, 6,511,930, 6,596,033 and 7,067,444, each of which is incorporated herein by reference.

In one embodiment, microfibers and nanofibers may be produced substantially simultaneously. Any fiber producing device described herein may be modified such that one or more openings has a diameter and/or shape that produces nanofibers during use, and one or more openings have a diameter and/or shape that produces microfibers during use. Thus, a fiber producing device, when rotated will eject material to produce both microfibers and nanofibers. In some embodiments, nozzles may be coupled to one or more of the openings. Different nozzles may be coupled to different openings such that the nozzles designed to create microfibers and nozzles designed to create nanofibers are coupled to the openings. In an alternate embodiment, needles may be coupled (either directly to the openings or via a needle port). Different needles may be coupled to different openings such that needles designed to create microfibers and needles designed to create nanofibers are coupled to the openings. Production of microfibers and nanofibers substantially simultaneously may allow a controlled distribution of the fiber size to be achieved, allowing substantial control of the properties of products ultimately produced from the microfiber/nanofiber mixture.

Figure 8:
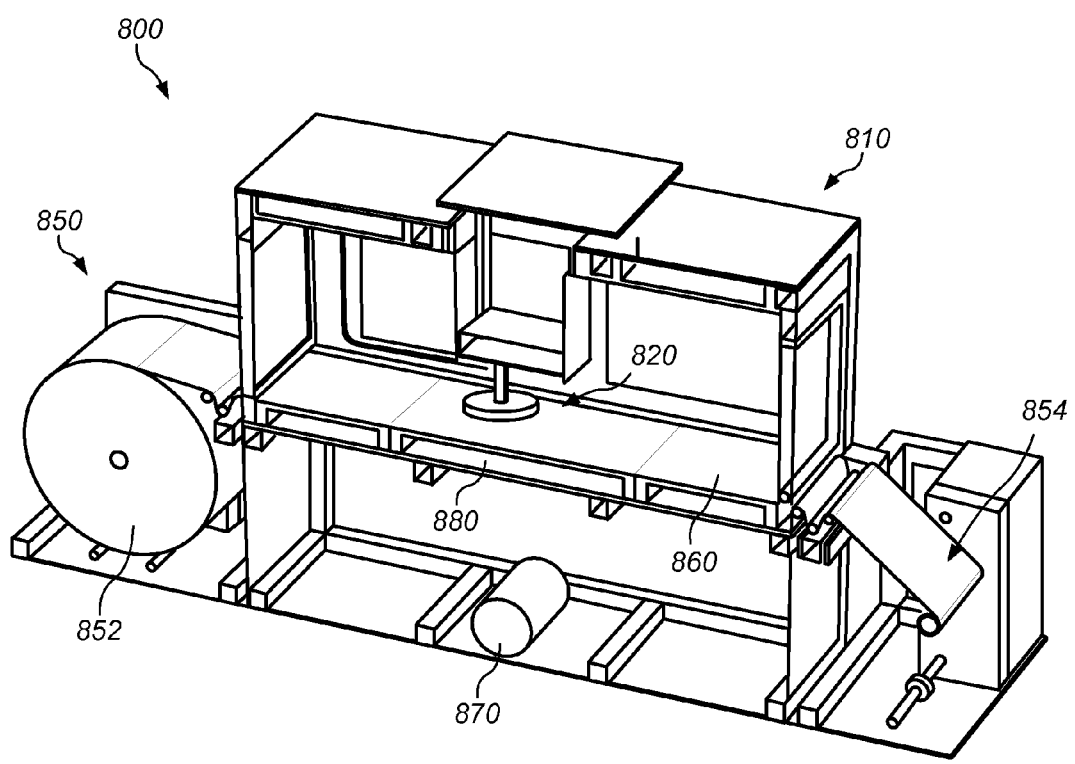
FIG. 8 depicts a fiber deposition system.

A top driven fiber producing system is particularly useful for depositing fibers onto a substrate. An embodiment of a system 800 for depositing fibers onto a substrate is shown in FIG. 8. System 800 includes a fiber producing system 810 and a substrate transfer system 850. Fiber producing system 810 includes a fiber producing device 820, as described herein. Fiber producing system produces and directs fibers produced by a fiber producing device toward a substrate 860 disposed below the fiber producing device during use. Substrate transfer system moves a continuous sheet of substrate material through the deposition system.

Figure 9:
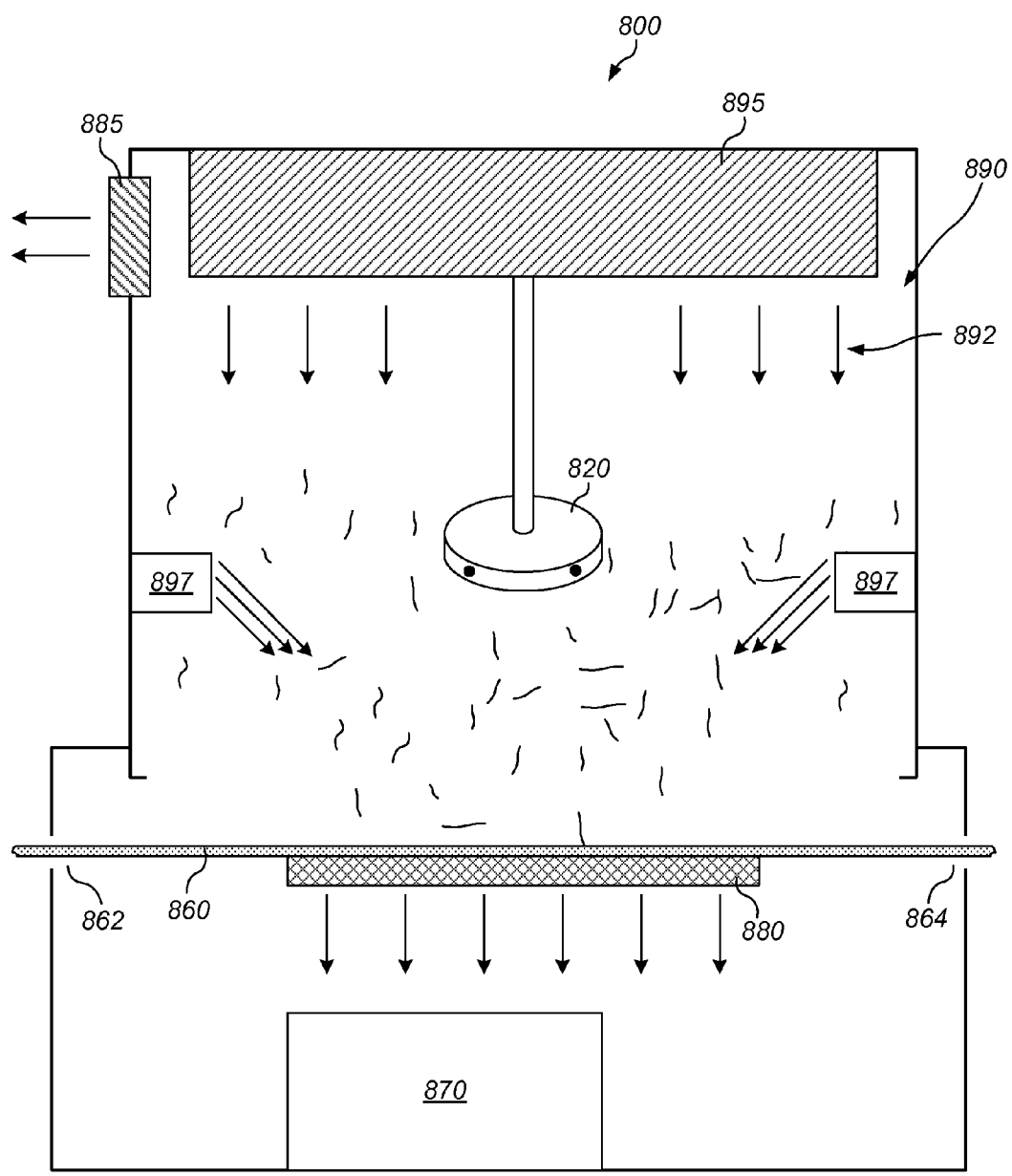
FIG. 9 depicts a schematic diagram of a fiber deposition system in use.

System 800, in one embodiment, includes a top mounted fiber producing device 820. During use, fibers produced by fiber producing device 820 are deposited onto substrate 860. A schematic diagram of system 800 is depicted in FIG. 9. Fiber producing system 810 may include one or more of: a vacuum system 870, an electrostatic plate 880, and a gas flow system 890. A vacuum system produces a region of reduced pressure under substrate 860 such that fibers produced by fiber producing device 810 are drawn toward the substrate due to the reduced pressure. Alternatively, one or more fans may be positioned under the substrate to create an air flow through the substrate. Gas flow system 890 produces a gas flow 892 that directs fibers formed by the fiber producing device toward the substrate. Gas flow system may be a pressurized air source or one or more fans that produce a flow of air (or other gases). The combination of vacuum and air flow systems are used to produce a "balanced air flow" from the top of the deposition chamber through the substrate to the exhaust system by using forced air (fans, pressurized air) and exhaust air (fans, to create an outward flow) and balancing and directing the airflow to produce a fiber deposition field down to the substrate. System 800 includes substrate inlet 862 and substrate outlet 864.

An electrostatic plate 880 is also positioned below substrate 860. The electrostatic plate is a plate capable of being charged to a predetermined polarity. Typically, fibers produced by the fiber producing device have a net charge. The net charge of the fibers may be positive or negative, depending on the type of material used. To improve deposition of charged fibers, electrostatic plate 880 may be disposed below substrate 860 and be charged to an opposite polarity as the produced fibers. In this manner, the fibers are attracted to the electrostatic plate due to the electrostatic attraction between the opposite charges. The fibers become embedded in the substrate as the fibers move toward the electrostatic plate.

A method of producing microfibers and/or nanofibers, includes: placing material in a fiber producing device, the material comprising a polymer and an ionizing compound. The fiber producing device is rotated at a speed of at least about 1000 rpm, wherein rotation of the fiber producing device causes material in the body to be passed through one or more openings and ejected through one or more openings to produce microfibers and/or nanofibers. As used herein an "ionizing compound" is a compound that is added to a polymer to create an overall net charge in the produced fibers. The "charged" fibers are attracted to oppositely charged systems. In one embodiment, a fiber producing system may have an electrically charged plate or belt that has an opposite charge to the net charge of the produced fiber to enhance deposition of the fiber. The use of charged fibers in this manner tends to produce a more homogenous distribution of the fibers.

Examples of ionizing compounds include, but are not limited to, ionic surfactants (e.g., anionic surfactants or cationic surfactants), organic salts, inorganic salts (e.g., metal halide salts), ionomers, and conductive carbon compounds (e.g., carbon black and carbon nanotubes). Examples of metal halide salts include Group 1 halide salts (e.g., LiCl, NaCl, KCl, LiBr, NaBr, KBr, etc.) and Group 2 halide salts (e.g., $CaCl_2$, $MgCl_2$, etc.) and transition metal salts (e.g., $ZnCl_2$, $H_2PtCl_2$, etc.). Ionomers are charged polymeric compounds. Examples of ionomers include, but are not limited to, polyaniline, polythiophene, polystyrene sulfonate, sulfonated tetrafluoroethylene based fluoropolymer-copolymers, and carboxylated acrylic copolymer latex. In some embodiments, a combination of one or more ionic surfactants, organic salts, inorganic salts, ionomers, and conductive carbon compounds may be mixed with a polymer to alter the properties of the formed fibers.

Organic salts include carboxylate salts and amine salts. Carboxylate salts are salts of carboxylic acids, and impart a generally negative charge to the fibers. Amine salts are salts formed from protonated 1° amines, protonated 2° amines, protonated 3° amines, and quaternary ammonium salts.

Surfactants that may be used include, but are not limited to, anionic surfactants (negatively charged surfactants) and cationic surfactants (positively charged surfactants). Anionic surfactants include, but are not limited to, sulfate, sulfonate, phosphate esters, and carboxylates. Specific examples of anionic surfactants include, but are not limited to, ammonium lauryl sulfate, sodium lauryl sulfate (SDS, sodium dodecyl sulfate), sodium laureth sulfate (also known as sodium lauryl ether sulfate (SLES)), sodium myreth sulfate, dioctyl sodium sulfosuccinate, perfluorooctanesulfonate (PFOS), perfluorobutanesulfonate, linear alkylbenzene sulfonates (LABs), sodium stearate, sodium lauroyl sarcosinate, perfluorononanoate, perfluorooctanoate (PFOA or PFO), and sodium oleate. Cationic surfactants include primary, secondary, tertiary and quaternary amines. Examples of quaternary amines include, but are not limited to, alkyltrimethylammonium salts (e.g., cetyl trimethylammonium bromide (CTAB), cetyl trimethylammonium chloride (CTAC), cetylpyridinium chloride (CPC), benzalkonium chloride (BAC), benzethonium chloride (BZT), 5-bromo-5-nitro-1,3-dioxane, dimethyldioctadecylammonium chloride, cetrimonium bromide, dioctadecyldimethylammonium bromide (DODAB). Anioniic surfactants, when added to a solution or melt, impart a negative charge on fibers that are produced from the mixture. The fibers may be drawn toward a substrate by placing a charged plate (or other structure) below the substrate, the charged plate drawing the oppositely charged fibers toward the substrate. In a like manner, cationic surfactants will also create charged fibers which can be drawn toward a substrate using an oppositely charged plate.

Surfactants may also be used to alter the properties of the produced fibers. Surfactants are generally amphiphilic compounds which include both hydrophobic and hydrophilic portions. When added to a polymer that is hydrophobic (e.g., polypropylene), the resulting mixture may be used to produce fibers that exhibit more hydrophilicity than fibers made from the untreated hydrophobic material. Generally, the more surfactant added the more hydrophilic the produced fibers will be. In an analogous way, hydrophilic material may be treated with surfactants to make generally hydrophilic fibers more hydrophobic. The use of surfactants in this manner may be used to alter the properties of the fibers. In an exemplary embodiment, sodium oleate may be added to polypropylene and the resulting mixture formed into fibers. The resulting fibers show significant hydrophilicity, when compared to unmodified polypropylene fibers.

A pressurized gas producing and distribution system may be used to control the flow of fibers toward a substrate disposed below the fiber producing device. During use fibers produced by the fiber producing device are dispersed within the deposition system. Since the fibers are composed primarily of microfibers and/or nanofibers, the fibers tend to disperse within the deposition system. The use of a pressurized gas producing and distribution system may help guide the fibers toward the substrate. In one embodiment, a gas flow system 890 includes a downward gas flow device 895 and a lateral gas flow device 897. Downward gas flow device 895 is positioned above or even with the fiber producing device to facilitate even fiber movement toward the substrate. One or more lateral gas flow devices 897 are oriented perpendicular to or below the fiber producing device. In some embodiment, lateral gas flow devices 897 have an outlet width equal to the substrate width to facilitate even fiber deposition onto substrate. In some embodiments, the angle of the outlet of one or more lateral gas flow devices 897 may be varied to allow better control of the fiber deposition onto the substrate. Each lateral gas flow devices 897 may be independently operated.

During use of the deposition system, fiber producing device 810 may produce various gasses due to evaporation of solvents (during solution spinning) and material gasification (during melt spinning). Such gasses, if accumulated in the deposition system may begin to affect the quality of the fiber produced. In some embodiment, the deposition system includes an outlet fan 885 to remove gasses produced during fiber production from the deposition system.

Substrate transfer system 850, in one embodiment depicted in FIG. 8, is capable of moving a continuous sheet of substrate material through the deposition system. In one embodiment, substrate transfer system 850 includes a substrate reel 852 and a take up reel system 854. During use, a roll of substrate material is placed on substrate reel 852 and threaded through system 800 to the substrate take up reel system 854. During use, substrate take up reel system 854 rotates, pulling substrate through deposition system at a predetermined rate. In this manner, a continuous roll of a substrate material may be pulled through fiber deposition system.

Microfibers and nanofibers produced using any of the devices and methods described herein may be used in a variety of applications. Some general fields of use include, but are not limited to: food, materials, electrical, defense, tissue engineering, biotechnology, medical devices, energy, alternative energy (e.g., solar, wind, nuclear, and hydroelectric energy); therapeutic medicine, drug delivery (e.g., drug solubility improvement, drug encapsulation, etc.); textiles/fabrics, nonwoven materials, filtration (e.g., air, water, fuel, semiconductor, biomedical, etc); automotive; sports; aeronautics; space; energy transmission; papers; substrates;

hygiene; cosmetics; construction; apparel, packaging, geotextiles, thermal and acoustic insulation.

Some products that may be formed using microfibers and/or nanofibers include but are not limited to: filters using charged nanofiber and/or microfiber polymers to clean fluids; catalytic filters using ceramic nanofibers ("NF"); carbon nanotube ("CNT") infused nanofibers for energy storage; CNT infused/coated NF for electromagnetic shielding; mixed micro and NF for filters and other applications; polyester infused into cotton for denim and other textiles; metallic nanoparticles or other antimicrobial materials infused onto/coated on NF for filters; wound dressings, cell growth substrates or scaffolds; battery separators; charged polymers or other materials for solar energy; NF for use in environmental clean-up; piezoelectric fibers; sutures; chemical sensors; textiles/fabrics that are water & stain resistant, odor resistant, insulating, self-cleaning, penetration resistant, anti-microbial, porous/breathing, tear resistant, and wear resistant; force energy absorbing for personal body protection armor; construction reinforcement materials (e.g., concrete and plastics); carbon fibers; fibers used to toughen outer skins for aerospace applications; tissue engineering substrates utilizing aligned or random fibers; tissue engineering Petri dishes with aligned or random nanofibers; filters used in pharmaceutical manufacturing; filters combining microfiber and nanofiber elements for deep filter functionality; hydrophobic materials such as textiles; selectively absorbent materials such as oil booms; continuous length nanofibers (aspect ratio of more than 1,000 to 1); paints/stains; building products that enhance durability, fire resistance, color retention, porosity, flexibility, anti microbial, bug resistant, air tightness; adhesives; tapes; epoxies; glues; adsorptive materials; diaper media; mattress covers; acoustic materials; and liquid, gas, chemical, or air filters.

Fibers may be coated after formation. In one embodiment, microfibers and/or nanofibers may be coated with a polymeric or metal coating. Polymeric coatings may be formed by spray coating the produced fibers, or any other method known for forming polymeric coatings. Metal coatings may be formed using a metal deposition process (e.g., CVD).

In some embodiments, web materials may be formed directly from a fiber generation processes. Web materials may include self supporting webs. Although some techniques described herein below may be matched with other fiber generation process (e.g., melt blown, spun bond, etc.) the proposed techniques presented will be particularly interesting for the nano fibers, whose production is discussed herein, from the spinning process in two ways. First, the potential ability to form truly nano fiber webs instead of the current practice of adding a nano layer to other media, will enable the benefits of nano fiber filtration—lower pressure drops for the same efficiency—to be fully realized. Second, the downstream processes, when developed, will add value to the stand alone fiber spinning technology presently discussed herein.

In some embodiments, an electric field may be used to inhibit agglomeration and/or entwining of the fibers as they are produced. It has been found that, in some instances, the fibers tend to agglomerate and become entwined with each other as they are ejected from a rotating fiber producing device. This agglomeration can lead to undesirable properties of the produced fibers for some applications. Agglomeration and/or entwining of the produced fibers may be inhibited by the application of an electric field to the fibers. In one embodiment, an electric field is created proximate to the fiber producing device. Unlike the electric field used in electrospinning processes, the created electric field is in a position that is not used to create the fibers. Instead, the electric field is positioned in the collection region of the apparatus, such that the fibers enter the electric field after they are produced. The electric field charges the produced fibers to inhibit agglomeration and/or entwining of the fibers. In some embodiments, the electric field may be positioned within a collection system to inhibit agglomeration and/or entwining of the fibers. The produced fibers, in this embodiment, travel toward the collection system and, when they reach the collection system become charged by the electric field to inhibit agglomeration and/or entwining.

In some embodiments, corona discharge technology may be used to create an electrostatic charge in the formed fibers. A device producing a corona discharge is placed proximate to a fiber producing device, such that the produced fibers enter the corona discharge field. The fibers entering this field become charged (either positively or negatively, depending on the type of corona discharge used). The charged fibers are attracted to a charged substrate or a charged plate (or belt) positioned below the fiber producing device. The use of electrostatic charges helps improve the uniformity of fibers used to coat a substrate. The corona discharge field used in this embodiment is placed in a position that is not used to influence the creation of the fibers. Instead, the corona discharge field is positioned in the collection region of the apparatus, such that the fibers enter the corona discharge field after they are produced.

In another embodiment, the electric field is created within the fiber producing device. The electric field will impart electrical charges to the formed fibers, thus inhibiting agglomeration and/or entwining of the fibers. In other embodiments, the material used to form the fibers may be charged prior to fiber formation (e.g., by the addition of charged surfactants). The chemically charged fibers will naturally repel each other, leading to reduced agglomeration and/or entwining. In some embodiments, a combination of chemically charged fibers and electric fields may be used to inhibit agglomeration and/or entwining. In an alternate embodiment, fiber may be charged by using an alpha particle emitter. An alpha particle emitter (e.g., a $^{210}$Po emitter) may be placed in the exit path of the fibers, sending alpha particles toward the emitted fibers. The alpha particles induce charges in the produced fibers, inhibiting agglomeration and/or entwining.

Fibers may be charged (either positively or negatively, using any of the methods set forth above. The charged fibers are attracted to a charged substrate, a charged plate, or a charge belt positioned below the fiber producing device. In one embodiment, a charged plate is placed under a non-charged substrate. The charged fibers are attracted to the charged plate, but become entrained within the substrate positioned above the charged plate. In an alternate embodiment, the substrate may be charged. For example, the substrate may be metal which is coupled to an electric source which creates a charge in the substrate. Alternatively, the substrate may be placed in an electric field or corona discharge field to impart a charge directly to the substrate. In this manner, the charged fibers will be attracted to the charged substrate directly, without the need for a charged plate.

In one embodiment, a substrate may be a flexible substrate coupled to a roller transport system. The substrate may be moved through a fiber producing system by winding the take up roller while unwinding untreated substrate from the substrate roller. A corona discharge bar may be placed proximate to the substrate, prior to the substrate entering the fiber producing system. As the substrate moves past the corona discharge bar, the substrate may become charged. The charged substrate then enters the fiber producing system where it attracts the oppositely charged fibers.

In this patent, certain U.S. patents, U.S. patent applications, and other materials (e.g., articles) have been incorporated by reference. The text of such U.S. patents, U.S. patent applications, and other materials is, however, only incorporated by reference to the extent that no conflict exists between such text and the other statements and drawings set forth herein. In the event of such conflict, then any such conflicting text in such incorporated by reference U.S. patents, U.S. patent applications, and other materials is specifically not incorporated by reference in this patent.

Further modifications and alternative embodiments of various aspects of the invention will be apparent to those skilled in the art in view of this description. Accordingly, this description is to be construed as illustrative only and is for the purpose of teaching those skilled in the art the general manner of carrying out the invention. It is to be understood that the forms of the invention shown and described herein are to be taken as examples of embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the spirit and scope of the invention as described in the following claims.

What is claimed is:

1. A method of producing microfibers and/or nanofibers, comprising:
   placing material in a fiber producing device, the material comprising a polymer and an ionizing compound, the fiber producing device comprising:
   a body comprising one or more openings and a coupling member, wherein the body is configured to receive material to be produced into a fiber, and wherein the fiber producing device is coupled to a driver by the coupling member;
   rotating the fiber producing device at a speed of at least about 1000 rpm, wherein rotation of the fiber producing device causes material in the body to be passed through the one or more openings, into one or more outlet elements, and ejected through the one or more outlet elements to produce microfibers and/or nanofibers, wherein the microfibers and/or nanofibers are not electrospun; and
   collecting at least a portion of the produced microfibers and/or nanofibers using an electrically charged plate.

2. The method of claim 1, wherein the ionizing compound is an ionic surfactant.

3. The method of claim 2, wherein the ionic surfactant comprises an anionic surfactant.

4. The method of claim 2, wherein the ionic surfactant comprises a cationic surfactant.

5. The method of claim 1, wherein the ionizing compound is an organic salt.

6. The method of claim 1, wherein the ionizing compound is an inorganic salt.

7. The method of claim 1, wherein the ionizing compound is a metal halide.

8. The method of claim 1, wherein the ionizing compound is a Group 1 or Group 2 halide salt.

9. The method of claim 1, wherein the ionizing compound is an ionomer.

10. The method of claim 1, wherein ionizing compound is a conductive carbon compound.

11. The method of claim 1, further comprising placing a substrate over the electrically charged plate; wherein fibers produced by the fiber producing device are drawn toward the substrate by the underlying electrically charged plate.

12. The method of claim 11, wherein the substrate is moved across the electrically charged plate while the microfibers and/or nanofibers are being produced.

13. The method of claim 1, further comprising:
   heating the material to a temperature sufficient to at least partially melt the material;
   heating the fiber producing device to a temperature at or near the temperature sufficient to at least partially melt the material; and
   placing the heated material in the heated fiber producing device.

14. The method of claim 1, further comprising:
   placing material in a fiber producing device; and
   heating the fiber producing device to a temperature at or near the temperature sufficient to at least partially melt the material disposed in the fiber producing device.

15. The method of claim 1, further comprising mixing the material with a solvent to produce a mixture of the material in a solvent, and placing the mixture in the fiber producing device.

16. The method of claim 1, wherein the body comprises one or more sidewalls together defining an internal cavity, wherein the one or more openings extend through a sidewall of the body, communicating with the internal cavity.

17. The method of claim 1, further comprising coupling the fiber producing device to the driver, wherein the driver is positioned above the fiber producing device.

18. The method of claim 1, further comprising placing the fiber producing device in a chamber, and controlling the environment inside the chamber.

19. The method of claim 1, further comprising collecting fibers on a collection system surrounding at least a portion of the fiber producing device.

20. The method of claim 1, wherein the openings are not coupled to an electrical current.

21. The method of claim 1, wherein the microfibers and/or nanofibers are ejected through the openings only by centrifugal force.

22. The method of claim 1, wherein the electrically charge plate is perpendicular to a rotational axis of the fiber producing device and the one or more openings are perpendicular to the rotational axis.

23. The method of claim 1, wherein the microfibers and/or nanofibers are created outside the electric field of the electrically charged plate.

24. The method of claim 1, wherein the fibers are subject to an electric field only after being produced.

25. The method of claim 22, wherein the electrically charged plate is axially offset from the one or more openings along the rotational axis such that the openings are not directed at the electrically charged plate.

* * * * *